(12) United States Patent
Breitenbach et al.

(10) Patent No.: US 9,559,755 B2
(45) Date of Patent: Jan. 31, 2017

(54) ELECTRICAL DEVICE, ELECTRICAL DEVICE SYSTEM

(71) Applicant: Robert Bosch GmbH, Stuttgart (DE)

(72) Inventors: Jan Breitenbach, Stuttgart (DE);
Andreas Kynast, Stuttgart (DE);
Georgios Margaritis, Schwieberdingen (DE); Christoph Steurer, Urbach (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 14/854,069

(22) Filed: Sep. 15, 2015

(65) Prior Publication Data

US 2016/0080038 A1    Mar. 17, 2016

(30) Foreign Application Priority Data

Sep. 15, 2014  (DE) .................... 10 2014 218 475

(51) Int. Cl.
*H04B 5/00* (2006.01)
*B25F 5/02* (2006.01)
*B25F 5/00* (2006.01)

(52) U.S. Cl.
CPC ............... *H04B 5/0031* (2013.01); *B25F 5/00* (2013.01); *B25F 5/02* (2013.01)

(58) Field of Classification Search
CPC .................................................. H04B 5/0031
See application file for complete search history.

(56) References Cited

U.S. PATENT DOCUMENTS

2013/0141217 A1    6/2013  Goren et al.
2014/0184397 A1*   7/2014  Volpert ................ G05B 19/05
                                              340/12.51

FOREIGN PATENT DOCUMENTS

WO    2008/019225 A2    2/2008
WO    2013/187340 A1   12/2013

* cited by examiner

*Primary Examiner* — Tuan H Nguyen
(74) *Attorney, Agent, or Firm* — Maginot, Moore & Beck LLP

(57) ABSTRACT

The disclosure relates to an electrical device having a control unit. A near field communication device connected to the control unit is provided.

4 Claims, 2 Drawing Sheets

ELECTRICAL DEVICE, ELECTRICAL DEVICE SYSTEM

This application claims priority under 35 U.S.C. §119 to application no. DE 10 2014 218 475.4, filed on Sep. 15, 2014 in Germany, the disclosure of which is incorporated herein by reference in its entirety.

BACKGROUND

The disclosure relates to an electrical device having a control unit and to an electrical device system comprising such an electrical device.

Electrical devices are known from the prior art. Both portable and fixed electrical devices are usually operated by at least one control unit, which controls, for example, an electrical drive of the electrical device and for this purpose, for example, draws electrical power from an electrical energy store of the electrical device. In addition, electrical device systems are also known, for instance comprising electrical devices and replaceable energy storage modules, which as such each likewise constitute an electrical device.

SUMMARY

The electrical device according to the disclosure has the advantage that it is easily possible to gather status data from the electrical device or download operating parameters to the electrical device. This is achieved according to the disclosure by providing a near field communication device, also referred to below as an "NFC device", which is connected to the control unit of the electrical device. Communication with the control unit can thereby be established by the NFC device in order to read, for instance, status data from the electrical device, which data the control unit records or monitors, or in order to provide the control unit with operating parameters for operating the electrical device.

It is preferably provided that the electrical device comprises a housing, wherein the NFC device is positioned on an inner surface of the housing, and the housing has a marker on its outer surface in the location where the NFC device is positioned on the inner surface. For near field communication it is advantageous if the NFC device or an antenna of the NFC device is arranged in spatial proximity to a further NFC device, or an antenna thereof, communicating with the NFC device. By providing a marker on the outer surface of the housing, a user can hence easily ascertain where the NFC device is positioned on the inner surface, so that the user can establish a fast and secure communications link for example by holding a read/write device, which is designed for near field communication, close to the NFC device.

It is also preferably provided that the electrical device is an energy storage module for a hand power tool, wherein the control unit records status parameters from an energy store of the energy storage module, and makes said parameters available for reading via the NFC device. In this case it is provided in particular that a readable memory is assigned to the NFC device and/or to the energy store, in which memory the control unit can or does store the data to be read or in other words the data made available. Hence, for instance, a user can read the memory of the energy storage module by means of near field communication and thereby gather in particular information about the charge level, the number of charging cycles or even an operating temperature.

Alternatively, it is preferably provided that the electrical device is a power tool and that the control unit records status parameters from the power tool, and makes said parameters available via the NFC device, and/or is designed to receive operating parameters via the NFC device and to control the power tool according to the received operating parameters. Hence it is possible to read status data from the power tool by near field communication, or to provide the power tool with operating parameters by means of near field communication, on the basis of which parameters the power tool is meant to be operated. Thus it is also possible, for example, by defining specific operating parameters by means of near field communication, to customize, enable or disable for the user individual functions of the power tool, for example in the manner of a child safety lock. Only when a user, for instance using his mobile phone by entering a password in the mobile phone, sends specific operating parameters to the NFC device can the full range of functions of the power tool be used.

It is also preferably provided that the NFC device and/or the control unit are connected to a readable/writeable memory, in particular a non-volatile readable/writeable memory. For instance, the transmitted operating parameters or the status parameters recorded by the control unit can be stored in the memory.

The NFC device is preferably designed to read an NFC tag. The NFC device is designed as an active NFC device in the sense that it can read a corresponding NFC tag. Thus, for example, by bringing close a specific NFC tag, it is possible to modify one or more operating parameters of the electrical tool that are provided by the NFC tag. Hence the user can, for instance, configure different operating parameters for the power tool by presenting different NFC tags.

The electrical device system according to the disclosure is characterized by an electrical device according to the disclosure and by an in particular mobile read/write device, which is designed to use near field communication to send data to the near field communication device or to receive data from the NFC device and in particular to display said data. When the electrical device is embodied as a replaceable energy storage module, in this case it is possible, for example, to use the read/write device to read the charge level of the energy storage module by means of near field communication.

The read/write device preferably comprises a remote communication device. Thus the read/write device can then also be used for remote communication in addition to near field communication. For instance it is provided in this case that information about the electrical device is read by means of near field communication, and transferred by means of remote communication to a central server or the like for the purpose of comparison, verification or purely for information. This facility can be used, for example, to establish the start of the warranty period, to forward error messages or to verify a user authorization.

In addition it is preferably provided that the read/write device is a mobile phone. A user can easily use his own mobile phone to configure functions of a power tool by sending data to the NFC device of the power tool by means of near field communication from his mobile phone. Since some of today's mobile phones are now also equipped as standard with near field communication devices for the purpose of sending and/or receiving data, this provides added value.

The electrical device system according to the disclosure is characterized by the electrical device according to the disclosure, which comprises an NFC device which is designed to read an NFC tag, and by a plurality of NFC tags, each of which comprises a readable memory, wherein different operating parameters for the electrical device are stored in the memories of the NFC tags. It is thereby possible for the user, by bringing a specific NFC tag close to the NFC device of the electrical device, to provide said electrical device with different operating parameters, for instance in order to enable, disable or customize various functions or settings of the electrical device.

BRIEF DESCRIPTION OF THE DRAWINGS

Exemplary embodiments of the disclosure are presented in the drawings an are explained in more detail in the description below.

In the drawings.

DETAILED DESCRIPTION

Figure 1:
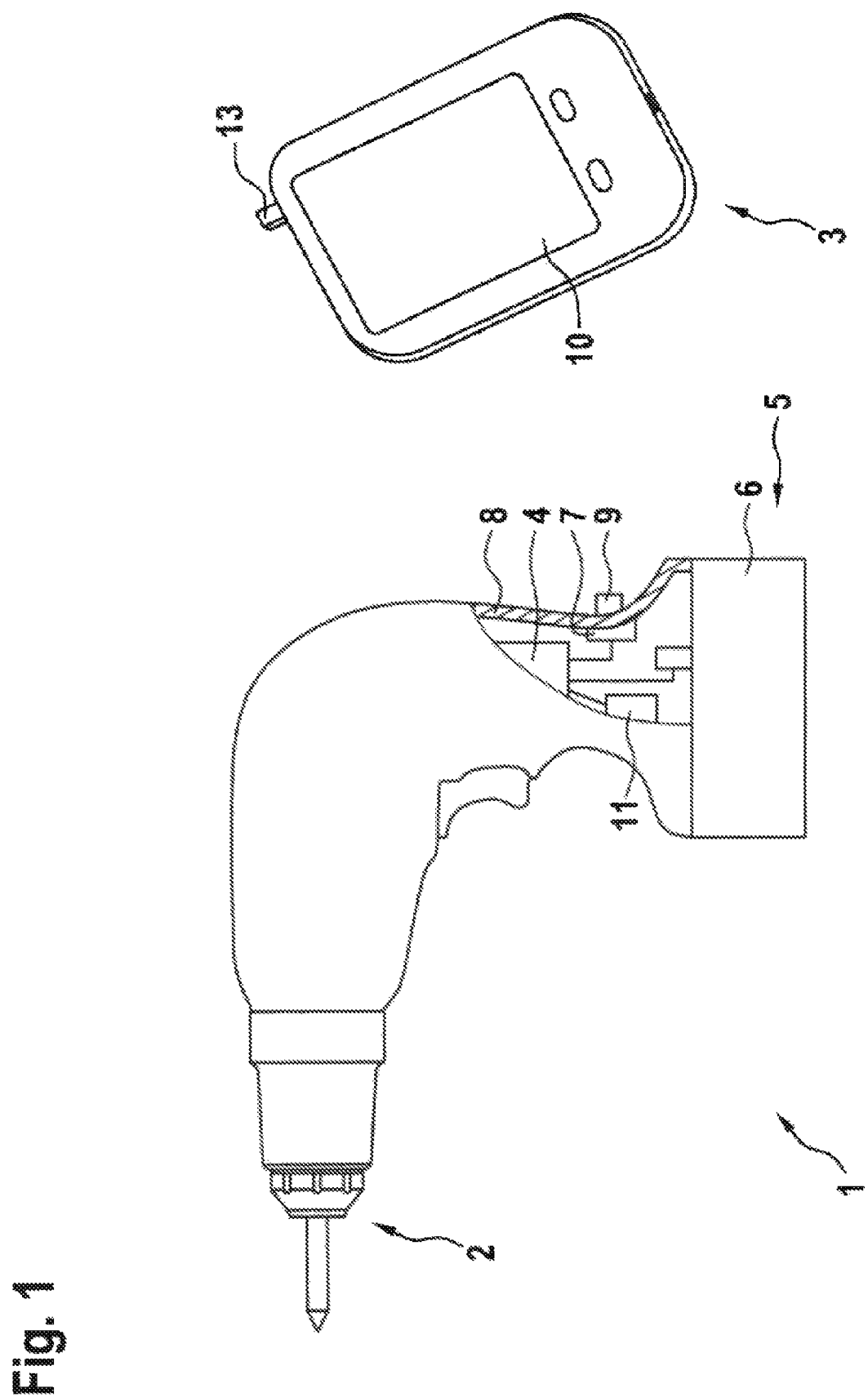
FIG. 1 shows an electrical device system according to a first exemplary embodiment.

FIG. 1 shows a simplified representation of an electrical device system 1, which comprises an electrical device 2, which here is embodied as a hand power tool in the form of a cordless electric screwdriver, and comprises a mobile read/write device 3, which is in the form of a mobile phone.

The electrical device 2 comprises a control unit 4, which is designed to drive a drive mechanism, in particular an electric motor, of the electrical device 2. For this purpose, the control unit 4 is connected, inter alia, to an energy store 5, which is arranged in a replaceable energy storage module 6. In addition, the control unit 4 is connected to a near field communications device 7, which is positioned on an inner surface of a housing 8 of the electrical device 2. On the outer surface of the housing 8 opposite the NFC device 7, which in particular is embodied as an NFC module, is a marker 9, here in the form of a protuberance, which indicates to a user the position of the NFC module. The mobile phone or the read/write device 3 is likewise designed for near field communication in order to exchange data with the NFC device 7. The read/write device 3 comprises a display 10, which can display status parameters from the electrical device 2. For this purpose it is provided that the mobile phone reads the status data by means of near field communication by the NFC module. The status data is in particular charge/discharge cycles, amounts of energy transferred both in total over the lifetime and currently over the last discharge process, and/or the health of the energy store 5. Likewise, the read/write device 3 can be used to transmit operating parameters to the electrical device 2, on the basis of which parameters the control unit 4 operates the electrical device 2. The radio interface of the near field communication thereby provides the user with the facility to download data to the electrical device 2, for instance in order to customize this device, read information about the electrical device 2, view device statistics and, if applicable, also acquire and administer information about the parts list for the electrical device 2.

It is provided in particular that a readable/writeable memory 11 is assigned to the control unit 4 and/or the NFC device 7, which memory provides relevant data or is designed to receive operating parameters. Preferably it is possible to write to the memory by means of a program of the mobile phone. Alternatively, instead of the internal memory 11 of the electrical device 2, a memory of the read/write device 3 can be used for the purpose of storing, retrieving and/or administering data. The read/write device also need not be a mobile component, but can instead be a fixed terminal.

The advantageous embodiment allows the user to store data in the electrical device 2, obtain data from the electrical device 2, in particular technical data from the operating manual, a parts-list summary, even without having an active connection to the electrical device, to administer the parts list, for example updating the charge capacity, to customize the electrical device, to use same as a data logger (technical variables) in order to develop user profiles, to view statistics such as, for instance, statistics on noise exposure or usage, to obtain an efficiency check and repurchase recommendation, and to locate the electrical device 2 in order possibly to safeguard against theft.

The NFC device 7 can be designed for this purpose as an NFC tag for instance. The NFC tag is preferably positioned away from heat sources and metallic components of the electrical device 2. The NFC device 7 is connected via a wired interface to the control unit 4, which is embodied in particular as a microprocessor. The control unit can thereby save or retrieve data.

To do this, a user brings in particular the antenna of his read/write device 3 into the immediate vicinity of the antenna of the NFC device 7, the position of which is indicated by the device 9. In this situation, it is possible simultaneously to transmit data to the electrical device 2 and also to read the data stored in the NFC tag or microcontroller or memory 11 of the electrical device 2.

Thus, for example, it is possible to transmit, on the date of sale or also later, the serial number of the electrical device 2 together with the date of sale directly from the retailer to the manufacturer of the electrical device 2. This automatically starts the registration of the warranty period. In addition, the warranty date can be stored in the memory 11 of the electrical device 2 for later use. Of course the method described can also be applied to other components, in particular of the electrical device 2, such as, for example, batteries, chargers, accessories or combi kits or the like.

The retailer possesses a suitable terminal/reader having a compatible radio interface for near field communication in order to perform read/write operations on the memory 11. The purchaser of the electrical device 2 need not perform a time-consuming registration process. The device is registered immediately. There is no need to enclose a purchase receipt. The device can be sent in without a receipt/proof of purchase. This results in an improved service for the customer and a quick and straightforward warranty handling process both for the customer and the manufacturer.

In normal operation, however, the customer can also use his mobile phone, for example, to access the NFC module of the electrical device 2 by means of near field communication, and customize or add to data stored by the retailer. Thus, for instance, the user can add his address data and save a photo of the invoice or the like. After successful registration, the customer can be sent by electronic means a certificate confirming the registration. By providing the NFC module in the electrical device 2 and by providing the connection to the control unit 4, it is possible also to store warranty-related data in the memory 11 or in the control unit 4. This increases the tamper-proof security and also the robustness of the system. In the event of a fault, in particular in the NFC device, the warranty period can then be read from the controller via a wired interface. During production, it is preferably ascertained that the serial number of the electrical device 2 stored in the memory 11 matches the number printed or labeled on the electrical device 2.

The described electrical device system 1 also provides the customer with the facility to use near field communication to write operating parameters for operating the electrical device 2 into the memory 11. The electrical device 2 subsequently works on the basis of the stored operating parameters. This has the advantage that the user always achieves the best work results and also, for example, cannot exceed a maximum speed specified by the tool attachment. Applications of interest here are, for example, a cordless electric screwdriver and tool attachment in conjunction with packaging or table: the cordless electric screwdriver comprises the NFC device 7, which on bringing together with packaging containing integral NFC tag, transmits, for example, a recommended maximum speed to the electrical device 2 and configures the operating parameters accordingly. The NFC tag, however, may also be attached, in particular glued, to the tool itself, in a suitable embodiment. Corresponding advantages are also obtained with a circular saw or jig saw as the electrical device.

The electrical device system 1 preferably comprises a multiplicity of NFC tags, which are, for instance, supplied in the form of a color fan with the electrical device 2, so that by bringing together an NFC tag with the electrical device 2, a user can configure any parameter, such as a maximum speed, for instance, an output power, an impact power, an impact rate or the like, depending on the embodiment of the electrical device 2. Of course the NFC module can also be positioned, in particular glued, on the outer surface of the housing 8. The NFC module is embodied in particular as an active or passive NFC chip.

The control unit 11 checks whether the transmitted values or operating parameters lie in a configurable range, and adjusts the behavior of the electrical device 2 either permanently or only for a defined or definable period of time.

Figure 2:
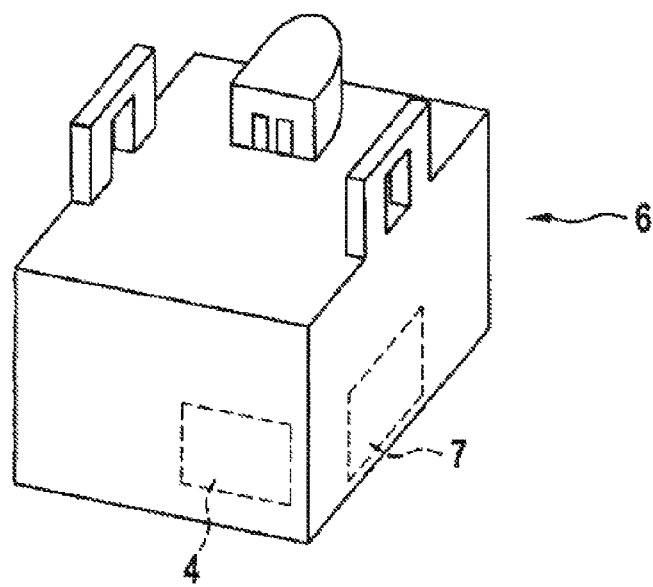
FIG. 2 shows an electrical device.

FIG. 2 shows a further exemplary embodiment, in which the electrical device 2 is in the form of a replaceable energy storage module 6, as was already previously shown in FIG. 1. In this case, the NFC device 7 is assigned to the energy storage module 6. The control unit 4 is likewise provided in the energy storage module 6, and is connected to the NFC device 7 and to the energy store 5. The control unit 4 here reads the data from the energy store 5, for instance data such as charge level, charge cycles or the like, and makes this data available via the NFC device 7. Hence data can easily be read, for instance using the aforementioned mobile phone. The control unit 11 records the various status parameters constantly or only during operation, and processes these parameters if applicable or stores same in the memory 11.

Figure 3:
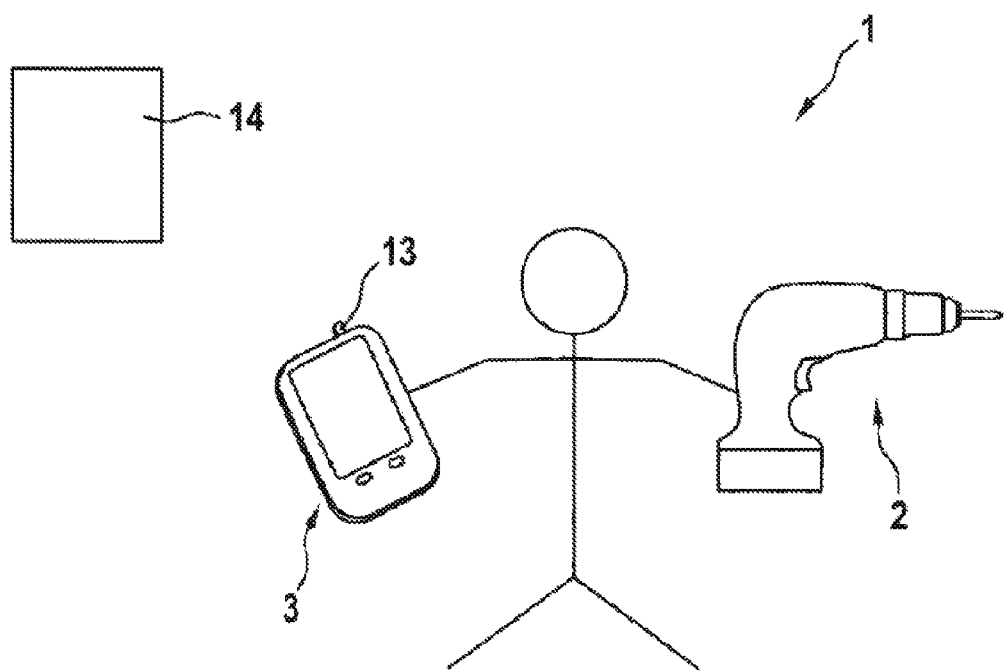
FIG. 3 shows an electrical device system according to a second exemplary embodiment.

FIG. 3 shows a further exemplary embodiment, in which the read/write device 3 additionally comprises a remote communication device 13 such as, for instance, a WLAN module or a radio communications device for a mobile communications network. The electrical device 2 communicates with the mobile phone by means of near field communication, as described above. The mobile phone or the read/write device 3 can now use the remote communication device 13 to exchange data with an infrastructure 14 such as, for example, a central server of the manufacturer or the like. Data from the electrical device 2, for instance data such as position, tool type and/or operating time, can be transmitted by means of near field communication to the mobile read/write device such as the previously described mobile phone, for example, but also a notebook or the like. The mobile device then supplies this data via the remote communication device 13 to the infrastructure 14. The following services can hence be performed, for example: locating the electrical device 2 by the infrastructure by transmission of the position, fleet management (company is informed about where the electrical device 2 is currently being used), data logger, namely logging the data from the electrical device 2, for instance data such as operating time, current waveforms or the like, creating user statistics, recording noise statistics relating to the user identified by the mobile device, creating recommendations for a new purchase and checking whether the user/customer is using the correct electrical device 2 for his purposes.

According to a further exemplary embodiment, which is not shown here, it is also possible to use the technology described above to show information about the contents of shipping boxes or the like on the display of the mobile phone or of another suitable reader. This can be done in the form of a list or also as a photo. In addition, further information, for example about the owner, the purchase date or the like can also be stored or displayed. For this purpose, the NFC device 7 is not positioned on an electrical device but positioned together with a microprocessor and the memory 11 on the shipping box, for instance glued onto or incorporated in said box. Bringing together the antennas of the NFC device and, for example, of the mobile phone, starts the data exchange already described above. In the simplest case, data is stored in the NFC module. For this purpose, the data is preferably written via the NFC interface to an EEPROM. It is possible, however, to store a unique number combination in the form of a code in the NFC module. This code can then be used to download the required information from a central server. Thus the costs of the NFC device can be reduced and more data stored. The data is additionally also available without scanning the NFC module, because once a code has been read it could be stored permanently in the read/write device or mobile phone. Implementing password protection is also possible. The following advantages are obtained by providing this technology to a shipping box: the shipping box does not need to be opened in order to ascertain the contents, which means that in particular stacked shipping boxes do not need to be removed. The NFC device is practically indestructible because it can be incorporated in the shipping box, and is impervious to water, dust, dirt or the like. It is easy to make changes or additions to the data. Links to product presentations can also be stored in the memory 11 at the point of sale. The list of contents can be created and produced in various ways: in the form of a photo, a list of bullet points and/or text elements produced by the applicant themselves, using parts-list numbers, if applicable including product photos and technical data, which can also be downloaded directly from the manufacturer, or a combination of all the above.

It is also possible to provide Bluetooth communication instead of an NFC standard for the near field communication.

What is claimed is:
1. An electrical device comprising:
a control unit;
a near field communication device connected to the control unit; and
a housing having an inner surface and an outer surface, the near field communication device being positioned on the inner surface, a marker being arranged on the outer surface at a location where the near field communication device is positioned on the inner surface;
wherein the electrical device is an energy storage module for a hand power tool, the energy storage module having an energy store; and the control unit is configured to (i) record status parameters from the energy store and (ii) make the status parameters available for reading via the near field communication device.

2. The electrical device according to claim 1, wherein:
the electrical device is a power tool; and
the control unit is configured to at least one of:
- record status parameters from the power tool and make the status parameters available for reading via the near field communication device;
- receive operating parameters via the near field communication device and control the power tool according to the operating parameters.

3. The electrical device according to claim 1, wherein at least one of the near field communication device and the control unit are connected to a memory that is readable and writable.

4. The electrical device according to claim 1, wherein the near field communication device is configured to read an NFC tag.

* * * * *